United States Patent [19]

Granig

[11] 4,366,976
[45] Jan. 4, 1983

[54] CUSHIONING MEANS FOR MOTOR VEHICLES

[76] Inventor: Hubert Granig, Feldkirchnerstr. 30/87, Klagenfurt, Austria

[21] Appl. No.: 138,621

[22] Filed: Apr. 8, 1980

Related U.S. Application Data

[62] Division of Ser. No. 916,739, Jun. 19, 1978, Pat. No. 4,225,168.

[30] Foreign Application Priority Data

Jun. 22, 1977 [AT] Austria ............................... 4415/77

[51] Int. Cl.³ ............................................. B60R 19/08
[52] U.S. Cl. ................................................ 293/134
[58] Field of Search ....................... 293/134, 107–110, 293/132; 280/784

[56] References Cited

U.S. PATENT DOCUMENTS

| 3,729,221 | 4/1973 | Granig | 293/134 |
| 3,751,092 | 8/1973 | Granig | 293/134 |
| 3,834,686 | 9/1974 | Moritz et al. | 293/134 |
| 4,205,753 | 6/1980 | Raeber | 293/134 |

FOREIGN PATENT DOCUMENTS 2135474  2/1972  Fed. Rep. of Germany ...... 293/110

Primary Examiner—Joseph F. Peters, Jr.
Assistant Examiner—Ross Weaver
Attorney, Agent, or Firm—Martin A. Farber

[57] ABSTRACT

A bumper bar is projected by hydraulic actuators, which communicate with a chamber, which is separate from the actuators and contains hydraulic liquid. The chamber and a floating piston are integrated in the bumper bar. This arrangement permits compact cushioning means to perform a large projecting stroke so that a correspondingly large distance for deceleration is available.

10 Claims, 15 Drawing Figures

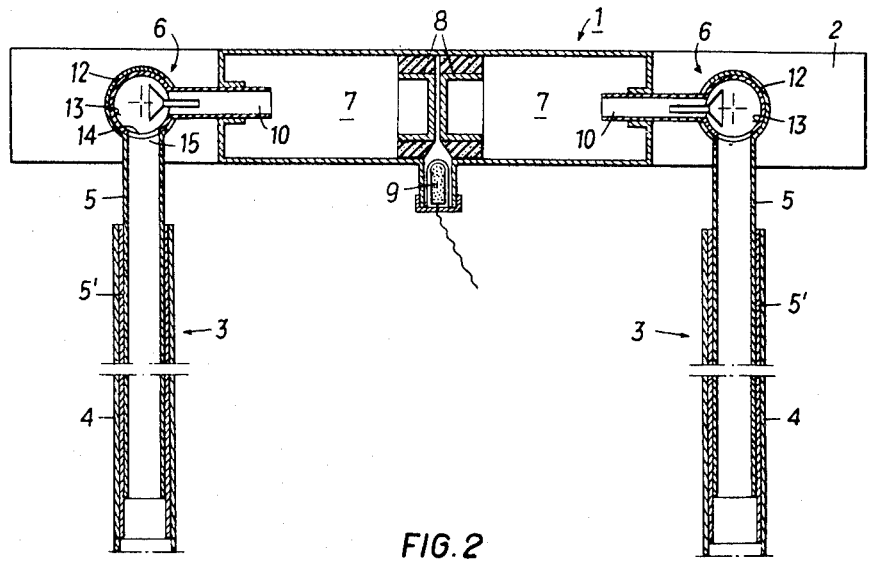
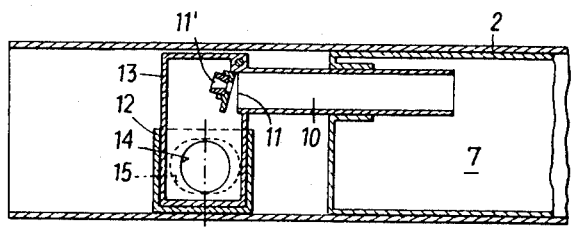
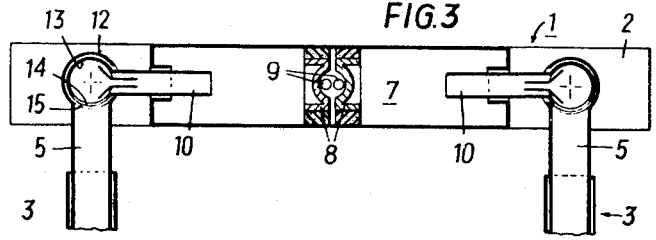
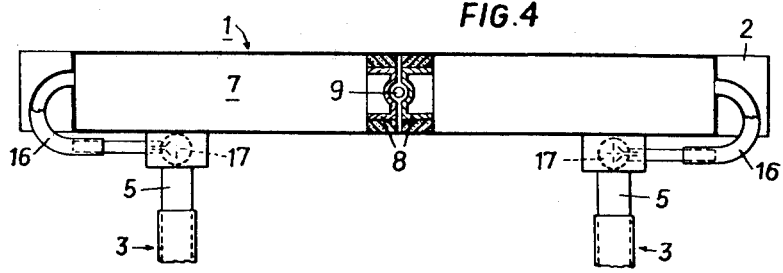

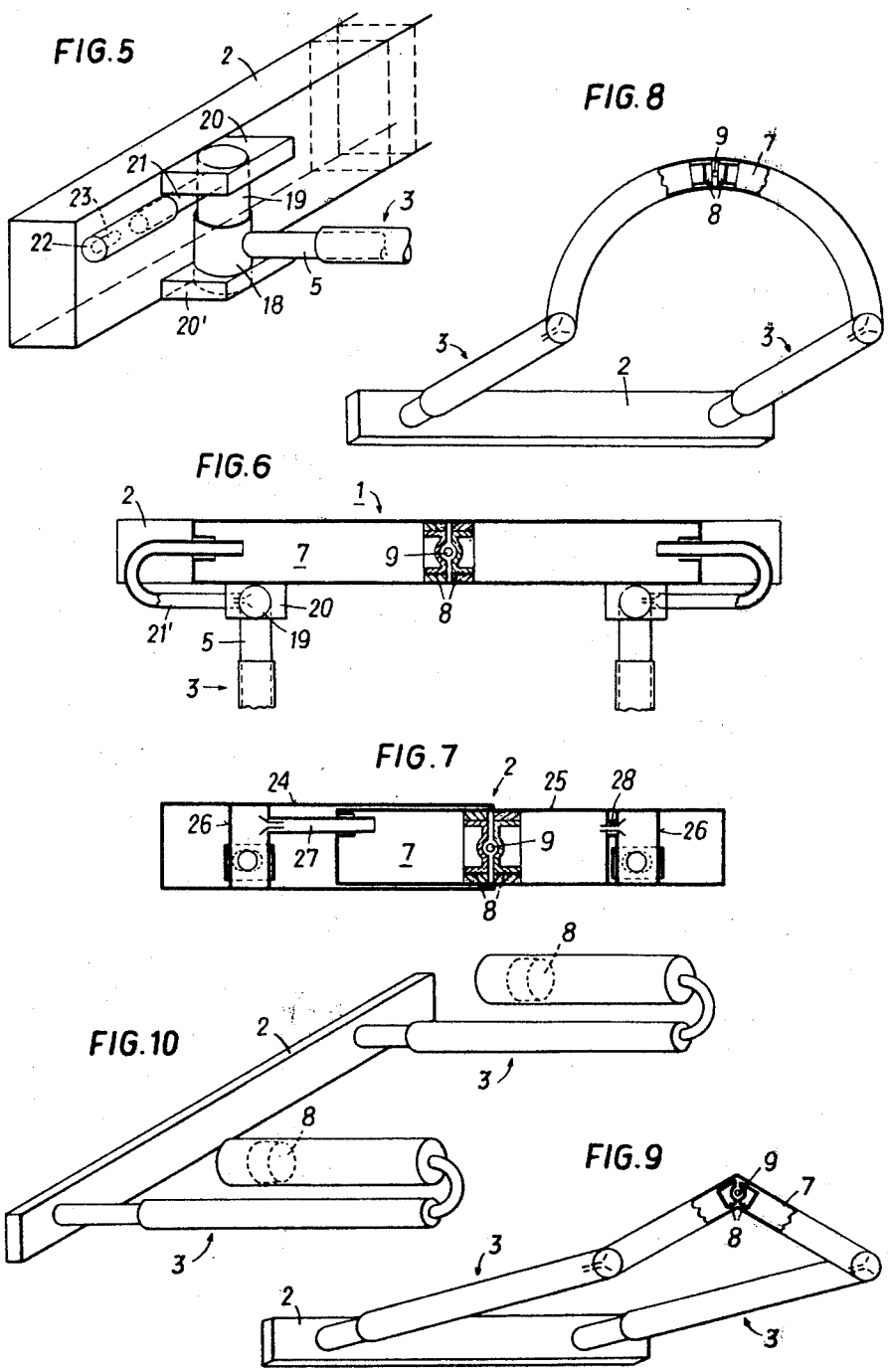

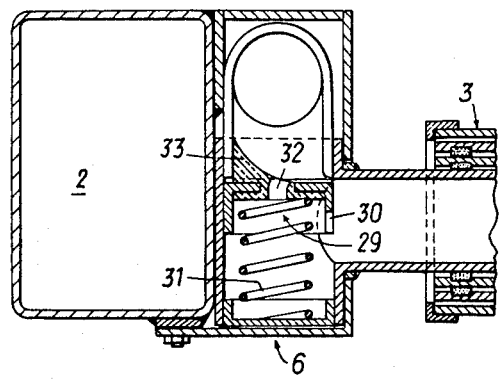
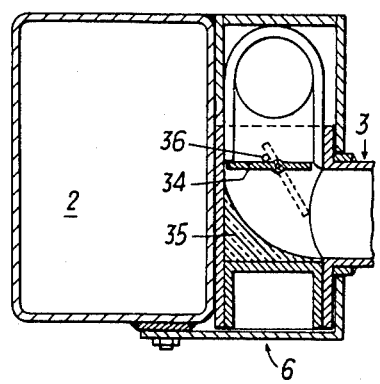
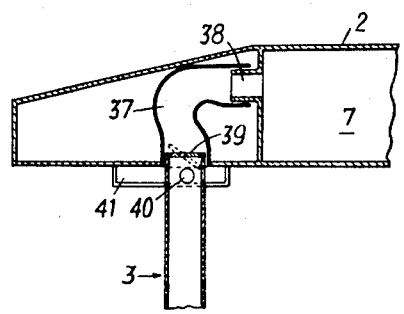
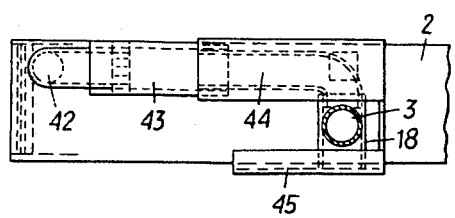
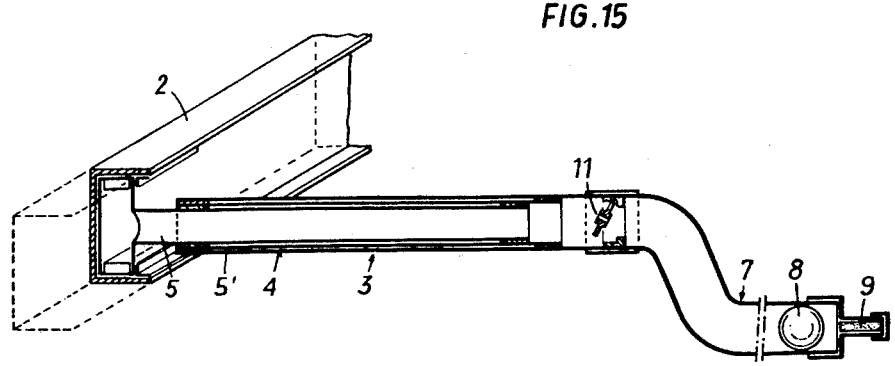

CUSHIONING MEANS FOR MOTOR VEHICLES

This is a division of application Ser. No. 916,739, filed June 19, 1978, now U.S. Pat. No. 4,225,168.

This invention relates to cushioning means for protecting a motor vehicle in case of an impact comprising at least one bumper bar, which is adapted to be projected from the vehicle by one or more telescopic hydraulic actuators and to be pushed back in case of an impact so as to absorb shock.

Cushioning means of the kind mentioned above are known, e.g., from Austrian Patent Specification No. 305,799. The known cushioning means involve the disadvantage that the hydraulic liquid which causes the actuator to be extended is contained in the actuator also when it has been pushed back. For this reason the actuators must have a certain cubic capacity and can be accommodated in the motor vehicle only with difficulty.

It is an object of the invention further to improve the known cushioning means for protecting a motor vehicle in case of an impact. This is essentially accomplished in that at least one chamber filled with hydraulic liquid is provided in the bumper bar, said chamber communicates with the actuator or actuators and contains at least one floating slidable piston and the chamber communicates with at least one explosive powder cartridge, a gas cartridge, a compressed air container or the like, which is operable to apply pressure to the floating piston and/or the hydraulic liquid so that such application of pressure to the hydraulic liquid or to the piston causes at least part of the liquid to be forced out of the chamber into the actuator or actuators in order to extend the latter.

The design according to the invention permits a much larger volume of hydraulic liquid to be held available than before so that the bumper bars can be projected to a much larger extent. Such projecting of the bumper bars to a larger extent permits a much softer damping because a larger distance is available for deceleration.

The operation of the powder cartridge, gas cartridge, compressed-air container, gas container or the like may be initiated by hand, when an impact is feared, or automatically. For this purpose a sensor or the like may be provided, which is disposed in front of the vehicle and is extended, e.g., when the speed of the vehicle exceeds a predetermined value.

Within the scope of the invention the chamber which holds the hydraulic liquid may desirably communicate with the actuator through a throttle valve.

A particularly simple design will be obtained if the actuator comprises a hollow piston, which preferably consists of a plurality of telescopic cylinder elements and the interior of which communicates with the chamber. In that case there is no need for separate conduits between the chamber and the actuator.

Also within the scope of the invention the actuator may have a hollow piston the interior of which communicates with the chamber and which in its head is provided with a throttle valve.

If the piston is telescopic and consists of a plurality of cylinder elements, one or more of these cylinder elements may be provided with a throttle valve, which may have an adjustable throttling action, if desired. If a plurality of throttle valves are provided, they may be adjusted to produce different throttling actions. One or more of such throttle valves may be combined with a throttle valve provided at the inlet to the chamber. In that embodiment the distance which is available for deceleration may be divided into sections in which different deceleration values are obtained and, e.g., a soft initial deceleration may be provided for.

In accordance with another feature of the invention the actuator is connected to the bumper bar by an articulated joint, which comprises a hollow cylinder, which has a substantially vertical axis and is carried by the actuator at that end thereof which is near the bumper bar, said hollow cylinder is rotatably and preferably displaceably mounted in the bumper bar, and a second hollow cylinder is rotatably mounted in the first-mentioned hollow cylinder and communicates with the chamber through a displaceable tube, a flexible metal tube or the like. In response to an impact which is not exactly centered, the bumper bar of such cushioning means will assume an oblique position so that the motor vehicle is deflected from the obstacle.

This length adjustment required for an oblique position of the bumper bar can also be ensured in that the bumper bar is telescopic. In that case the two sections of the telescopic bumper bar are connected to the actuators by respective articulated joints.

The end walls of the chambers holding the hydraulic liquid may constitute displaceable pistons, to which the actuators are pivotally connected.

The cushioning means will usually comprise two actuators. It has proved satisfactory to provide in the bumper bar a chamber which holds hydraulic liquid and communicates with two actuators and contains two floating pistons, which in response to an application of pressure are displaceable in opposite directions. If, within the scope of the invention, at least one powder cartridge, compressed-air container or the like is associated with the pistons and operable to apply pressure to both of them at the same time, the two actuators will be extended uniformly and at the same time.

Further details and advantages of the invention will become apparent from the following description of embodiments which are shown diagrammatically and by way of example on the accompanying drawing.

FIG. 1 is a sectional view showing an embodiment of the cushioning means according to the invention for protection against impact, FIG. 2 is a partly sectional view showing a detail of the cushioning means of FIG. 1, FIG. 3 is a sectional view showing another embodiment, FIG. 4 is a sectional view showing a third embodiment, FIG. 5 a perspective view showing a detail of cushioning means for protection in case of an impact, FIG. 6 a sectional view showing a fourth embodiment and FIG. 7 an embodiment comprising a bumper bar which is variable in length, FIGS. 8 to 10 show three embodiments in which the chamber for holding the hydraulic liquid is disposed outside the bumper bar.

FIGS. 11 to 14 show details of the means which connect the bumper bar to the actuators.

FIG. 15 shows an embodiment comprising a chamber which is integrated in the carrying structure of the motor vehicle.

The cushioning means 1 shown in FIG. 1 for protection in case of an impact comprise a bumper bar 2, which is connected to two actuators 3. The actuators 3 are connected to the support structure of a motor vehicle, e.g., to the chassis thereof, or constitute part of such support structure, e.g., of the chassis. Each actuator 3 comprises an outer cylinder 4 and inner cylinder elements 5, 5', which are arranged in and displaceable relative to the cylinder 4. In the embodiment shown the inner cylinder elements 5, 5' are hollow but a conventional piston may be used instead. Instead of actuators 3 having more than two parts, two-part actuators may be provided (see FIG. 3). The interior of the inner cylinder element 5 is connected to the bumper bar 2 by an articulated joint 6.

The bumper bar 2 contains a chamber 7, which is associated with both actuators 3 and which is filled with hydraulic liquid just as the actuators 3 and the articulated joints 6. The chamber 7 contains two floating pistons 8, which serve to force hydraulic liquid out of the chamber 7 into the actuators 3. The pistons can be displaced by the application of pressure, e.g., from at least one powder cartridge, a compressed-air container or the like, which communicates with the chamber 7 and is diagrammatically indicated in FIG. 1 at 9. The hydraulic liquid flows out of the chamber 7 into the actuators 3 through tubes 10, which are displaceable relative to the chamber 7, and the articulated joints 6 so that the actuators 3 of the cushioning means 1 for protection in case of an impact are extended.

In the embodiment shown in FIG. 2, the tube 10 is provided with a throttle valve 11, which consists essentially of a hinged plate valve and opens up a large cross-section of flow for hydraulic liquid from the chamber 7 into the actuator 3 and specifically the inner cylinder element 5 thereof.

When the cushioning means 1 are pushed together in case of an impact and the hydraulic liquid then flows out of the actuators back into the chamber 7, the throttle valve 11 leaves only a small cross-section of flow 11' so that the cushioning means absorb the shock as they are pushed back. The design of the throttle valve is not critical. Valves set to fixed throttling actions may be used just as throttling valves having an adjustable throttling action. The throttling action may be adjusted, e.g., automatically or manually in dependence on the weight or useful load of the vehicle and/or in dependence on the speed of travel.

In another embodiment of the cushioning means according to the invention for protection in the case of an impact, the shock-absorbing action is also performed by pneumatic means. In that embodiment the pressure fluid which has passed through the constriction is conducted into the open or into an expansion vessel.

In a further embodiment the inner cylinder 5 has a piston head in which a throttle valve is provided.

In a simplified embodiment, pressure is applied to the hydraulic liquid directly rather than by means of the floating piston.

In the embodiment shown in FIG. 1, pressure can be applied to the floating pistons 8 by one or more powder cartridges, compressed-air containers or the like, which communicate with the chamber 7. Alternatively, a chamber and at least one powder cartridge or the like may be associated with each piston, as is shown in FIG. 3.

The cushioning means may be extended to, e.g., two different extents, which can be controlled in dependency on the velocity of the motor vehicle. For this purpose at least one restraining cable may be wound on a drum, which is adapted to be locked, and said cable may be arranged to arrest the bumper bar when it has been extended to the desired extent. Such cables may also be used to retract the cushioning means and particularly its bumper bar after it has been projected. Different projecting strokes can also be obtained by the application of different pressures. The projecting stroke may also be limited in that the displacement of the floating pistons in the chamber or chambers is limited by electrically operable locking pins.

When the bumper bar 2 has been pushed back to its initial position, the build-up of an excessive, detrimental pressure in that portion of the chambers 7 which is sealed by the piston 8 and not filled with hydraulic liquid should be avoided. Such an excessive pressure can be avoided in that one or more outlet openings for the pressure fluid supplied to the piston are opened when the actuator has been completely extended.

A relief valve may be provided for relieving the surplus pressure. The pressure can be selected so that the cushioning means are extended several times. This is desirable in case of repeated impacts, e.g., against roadside trees.

Each articulated joint 6 between the bumper bar 2 and an actuator 3 comprises a hollow cylinder 12, which is connected to the inner cylinder element 5 and extends at right angles thereto, and a hollow cylinder 13 which is rotatably mounted in the hollow cylinder 12 and displaceably mounted in the bumper bar 2. The hollow cylinder 13 communicates with the chamber 7 through the above-mentioned, displaceable tube, which is provided with the throttle valve 11. This communication is particularly clearly apparent from FIG. 2. The cylinders 12 and 13 are formed with respective openings 14 and 15, which are aligned with each other and with the hollow cylinder 5. This arrangement permits the hydraulic fluid to flow through the tube 10, the throttle valve 11, the inner cylinder 13 and the openings 15 and 14 into the interior of the hollow cylinder element 5.

Rather than in the tube, the throttle valve 11 may be provided, e.g., at the inlet of the cylinder element 5 from the hollow cylinder 13, at the opposite end of the cylinder element 5 or in the hollow cylinder 13 itself.

In the embodiment shown in FIG. 4 the hydraulic fluid is forced by the floating pistons 8 to flow out of the chamber 7 through pressure-resisting flexible tubes 16 to the actuators 3. Each actuator 3, specifically its inner cylinder element 5, is connected to the bumper bar 2 by a hollow cylinder 17 so as to be rotatable and displaceable in the longitudinal direction of the bumper bar. This arrangement enables the change in length which is required for an oblique position of the bumper bar 2. FIG. 4 shows also that the throttle valve is accommodated in the cylinder 17 although the throttle valve may be disposed at other locations in the cushioning means, e.g., at the locations stated by way of example hereinbefore, just as in the other embodiments.

Alternative means for displaceably connecting the bumper bar 2 to the actuators 3 are shown in FIG. 5. In this embodiment the inner cylinder element 5 of the actuator 3 carries an upright hollow cylinder 18, in which another hollow cylinder 19 is rotatably mounted. Both cylinders 18 and 19 are guided in brackets 20, 20' so as to be displaceable in the longitudinal direction of the bumper bar 2, to which the brackets 20, 20' are secured. A tube 21 is secured to the cylinder 19 and is slidably mounted in another tube 22, which communicates with the interior of the chamber 7 through an aperture 23.

The embodiment of the protecting system shown in FIG. 6 is similar to that of FIG. 5 but comprises a substantially U-shaped, curved tube 21', which is secured to the cylinder 19 and directly extends into the chamber 7 and is slidable relative to the latter. In this arrangement, the bumper bar 2 can be laterally displaced relative to the actuators 3. This is essential in the present arrangement in case of an oblique impact which moves the bumper bar to an oblique position.

In the embodiment shown in FIG. 7 the bumper bar itself is telescopically variable in length and comprises two tubes 24 and 25 slidably fitted one in the other. The chamber 7 for holding the hydraulic liquid is contained in the tube 25. In this embodiment the cylinders 26, which correspond to the cylinders 13 of FIG. 1, are secured in the tubes 24 and 25, respectively. The left-hand cylinder 26 in FIG. 7 communicates with the chamber 7 through a tube 27, which opens into the chamber 7 and is displaceable relative to the latter. The right-hand cylinder in FIG. 7 is connected by a tube 28 to the chamber 7. In other respects, the embodiment shown in FIG. 7 may be similar to the embodiments shown in FIGS. 1 to 3.

In the embodiments of the cushioning means shown in FIGS. 8, 9, and 10, the chambers for the hydraulic liquid are disposed outside the bumper bar 2. Two basic embodiments are contemplated. In one embodiment, two floating pistons are displaceable in one chamber, as is shown in FIGs. 8 and 9. Alternatively, two separate chambers may be provided, as is shown in FIG. 10.

In the embodiments of the protecting system according to the invention shown in FIGS. 12 and 13, the throttle valve is accommodated in the articulated joint 6, which connects the bumper bar 2 to the actuator 3.

In the embodiment shown in FIG. 11 the throttle valve 29 comprises a valve member 30, which is urged by a coil spring 31 to its throttling position, which is shown in FIG. 11. In this position the hydraulic liquid can flow back from the actuator 3 into the chamber 7 only through the constriction 32. When the hydraulic liquid is flowing out of the chamber 7 into the actuators 3, the valve member 30 is forced down against the force of the spring 31 so that the flow of the hydraulic liquid is almost unimpeded. A fairing member 33 is provided on the valve member 30 to improve the streamlining at the transition.

The throttle valve shown in FIG. 12 consists of a hinged plate valve 34, which is asymmetrical with respect to its hinge axis. A stop 36 defines the two end positions of the hinged plate. A fairing member 35 is provided in the articulated joint 6 and minimizes the drag opposing the flow of hydraulic liquid from the chamber 7 into the actuator 3.

An additional embodiment of the cushioning means according to the invention is shown in FIG. 13. In this embodiment, the actuator 3 is connected by a pressure-resisting flexible tube 37 to the chamber 7, which is disposed in the bumper bar 2. One end of the flexible tube 37 is fitted on and secured to a connecting pipe 38, which is connected to the chamber 7. The flexible tube 37 is also connected to the forward end of the actuator 3 by a pressure-resisting joint. The forward end of the actuator 3 carries an asymmetrical hinged plate valve 39, which constitutes a throttle valve. By a pivot pin 40, which extends into brackets 41 on the bumper bar 2, the actuator 3 is connected to the bumper bar 2 so as to be displaceable and pivotally movable relative thereto.

In the embodiment shown in FIG. 14, the cushioning means according to the invention comprise different means enabling a lateral displacement of the articulated joint between the actuator and the bumper bar. The chamber 7 which is provided in or on the bumper bar 2 is provided with a pipe bend 42. A tube 43 is connected to the free end of the pipe bend 42 by a pressure-resisting joint, e.g., a screwed joint. Another pipe bend 44 extends into the tube 43 and is displaceable in the longitudinal direction of the tube 43. The other end of the pipe bend 44 is connected to the actuator. A throttle valve, not shown, may be interposed between the pipe bend 43 and the actuator, if desired. The joint between the pipe bend 44 and the actuator 3 is so designed that the actuator is pivotally movable relative to the tube 43 and the bumper bar. Besides, the actuator 3 or the hollow cylinder 18 provided at the forward end of the actuator is guided in a bracket 45 to be displaceable in the longitudinal direction of the bumper bar 2 relative to the latter.

In a preferred embodiment, the piston for forcing the hydraulic liquid out of the chamber may be surrounded by elastically deformable material so that said piston will not be seized in the chamber when the latter is deformed.

Alternatively, the floating piston may be intentionally restrained during its return, e.g., by clamps, by a member which is being upset, by shearing work and the like. This restraint of the floating piston during its return serves to effect a controlled deceleration as the actuators are pushed back.

The means for connecting the cushioning means to the motor vehicle or its support structure may be designed so that said connecting means are detached, deformed upset or the like when the force thereon exceeds a certain limit. In this case any residual energy left in case of a heavy collision can be taken up by an additional deformation of the forward or rear part of the vehicle. It will be understood that this deformation of the front or rear part of the vehicle may take place not only in case of a particularly strong impact but the design may be such that such deformation takes place even at medium speeds.

Embodiments of the cushioning means according to the invention have been described hereinbefore only by way of example and may be modified in various respects within the scope of the invention. For instance, the chambers shown in FIG. 10 may succeed the actuators and may be directly connected thereto, for instance, as is shown in FIG. 15. This embodiment may be selected, e.g., when an engine mount is used to define a chamber 7 according to the present invention. As has been shown in FIGS. 8, 9, 15, the chambers 7 may be curved. In that case, any floating piston 8 which is used must be elastically deformable. This can be accomplished, e.g., in that the piston 8 is made of elastic material, such as plastic material, rubber. Alternatively, a metal piston or the like which is covered with elastic material, such as rubber, may be used, or a spherical piston 8, such as is shown in FIG. 15.

The cushioning means does not necessarily comprise the floating piston provided in the embodiments described above. In embodiments without the floating piston the pressure applying means directly applies pressure onto the fluid.

What is claimed is:

1. Cushioning means for motor vehicles, comprising bumper bar means,
fluid pressure-operable actuator means carrying said bumper bar means and extensible to project said bumper bar means,
reservoir means which define a chamber adapted to hold a fluid and communicating with said actuator means and adapted to supply fluid to said actuator means so as to extend the latter,
pressure-applying means operable to apply pneumatic pressure to said fluid in said chamber to cause fluid to be forced from from said chamber to said actuator means to extend the same,
said actuator means comprise a plurality of fluid pressure-operable actuators carrying said bumper bar and extensible to project said bumper bar,
said reservoir means define a plurality of chambers, each of which is adapted to hold said fluid and adapted to supply the fluid to one of said actuators so as to extend the latter,
said reservoir means comprise a plurality of floating pistons, each of which defines one of said chambers,
said pressure-applying means are operable to apply pneumatic pressure to said fluid in said chambers by means of said floating pistons, and
said reservoir means comprise two of said floating pistons arranged to move in mutually opposite directions in response to pneumatic pressure applied by said pressure-applying means to said floating pistons.

2. Cushioning means as set forth in claim 1, in which said pressure-applying means comprise an explosive powder cartridge for applying pneumatic pressure to both said floating pistons at the same time.

3. Cushioning means as set forth in claim 1, in which said pressure-applying means comprise a gas cartridge for applying pneumatic pressure to both said floating pistons at the same time.

4. Cushioning means as set forth in claim 1, in which said pressure-applying means comprise a compressed air container for applying pneumatic pressure to both said floating pistons at the same time.

5. Cushioning means for motor vehicles, comprising bumper bar means,
fluid pressure-operable actuator means carrying said bumper bar means and extensible to project said bumper bar means,
reservoir means which define a chamber adapted to hold a fluid and communicating with said actuator means and adapted to supply fluid to said actuator means so as to extend the latter,
pressure-applying means operable to apply pneumatic pressure to said fluid in said chamber to cause fluid to be forced from from said chamber to said actuator means to extend the same,
said actuator means comprise two fluid pressure-operable actuators, each of which is connected at one end thereof to said bumper bar by an articulated joint,
each of said articulated joints comprises first and second hollow cylinders having a substantially vertical axis,
said first hollow cylinder is carried by and communicates with the associated actuator at said one end thereof,
one of said hollow cylinders is rotatably mounted in said bumper bar,
the other of said hollow cylinders is rotatably mounted in said one said hollow cylinder, and
said second hollow cylinder communicates with said first hollow cylinder and with said chamber.

6. Cushioning means as set forth in claim 5, in which said second hollow cylinder communicates with said chamber through a displaceable tube.

7. Cushioning means as set forth in claim 5, in which said second hollow cylinder communicates with said chamber through a flexible metal tube.

8. Cushioning means as set forth in claim 5, in which each of said actuators communicates with said chamber through a throttle valve accommodated in said articulated joint.

9. Cushioning means as set forth in claim 5, in which said other hollow cylinder is displaceable in the longitudinal direction of said bumper bar.

10. Cushioning means as set forth in claim 5, in which said first hollow cylinder is rotatably mounted in said bumper bar and
said second hollow cylinder is rotatably mounted in said first hollow cylinder.

* * * * *